United States Patent [19]

Dagg

[11] Patent Number: 5,393,193
[45] Date of Patent: Feb. 28, 1995

[54] VEHICLE FOR TRANSPORT AND PLACEMENT OF GRAVE HEADSTONES

[76] Inventor: Stuart A. Dagg, 4422 N. "C" St., Spokane, Wash. 99205

[21] Appl. No.: 141,263

[22] Filed: Oct. 22, 1993

Related U.S. Application Data

[63] Continuation-in-part of Ser. No. 885,145, May 18, 1992, abandoned.

[51] Int. Cl.⁶ .................................................. B60P 1/54
[52] U.S. Cl. ............................... 414/540; 188/72.8; 212/245; 212/254
[58] Field of Search ............... 414/540, 541, 543, 547, 414/548, 550; 188/72.8; 212/189, 230, 245, 254; 280/766.1, 763.1

[56] References Cited

U.S. PATENT DOCUMENTS

| | | | |
|---|---|---|---|
| 500,328 | 6/1893 | Hays | 414/543 |
| 1,736,419 | 11/1929 | Smith | 212/245 X |
| 2,496,401 | 2/1950 | McKinney | 414/543 |
| 2,509,950 | 5/1950 | Zierke | 414/543 |
| 2,776,761 | 1/1957 | Lovelace | 212/230 X |
| 2,915,206 | 11/1959 | Doswell | 414/542 |
| 2,956,691 | 10/1960 | Fangman | 414/541 |
| 3,024,873 | 3/1962 | Wilkinson | 188/72.8 X |
| 3,501,031 | 3/1970 | Whitfield | 414/543 |
| 3,879,050 | 4/1975 | Young | 414/540 |
| 3,978,989 | 9/1976 | Avila, Jr. | 414/543 X |
| 4,014,411 | 3/1977 | Troester | 188/72.8 X |
| 4,050,549 | 9/1977 | Hori et al. | 188/72.8 |
| 4,241,838 | 12/1980 | Hayes | 414/541 D X |
| 4,597,498 | 7/1986 | Spinosa et al. | 414/543 X |
| 4,643,320 | 2/1987 | Larsen | 212/254 X |
| 5,251,768 | 10/1993 | Yashimatsu et al. | 212/245 X |
| 5,282,714 | 2/1994 | Diebolt | 212/245 X |

FOREIGN PATENT DOCUMENTS

| | | | |
|---|---|---|---|
| 162748 | 5/1955 | Australia | 414/543 |
| 211982 | 11/1960 | Austria | 414/543 |
| 216709 | 1/1961 | Austria | 414/543 |
| 654200 | 10/1964 | Belgium | 414/543 |
| 1342281 | 1/1974 | United Kingdom | 414/543 |

*Primary Examiner*—David A. Bucci
*Attorney, Agent, or Firm*—Keith S. Bergman

[57] ABSTRACT

A two-wheeled trailer carries an adjustably rotatable crane to allow loading and placement of grave headstones by a single worker. The trailer provides a ladder type frame supporting a bed with upstanding sides and openable tailgate. The frame is supported for locomotion by a two-wheeled truck and has tongue structure with vertically adjustable supports. The tongue structure immediately forwardly of the body supports a crane base that journals an angulated crane mast carrying a boom structure, with adjustable braking mechanism communicating between the mast and base to regulate rotation of the mast. The crane mast carries a hoist to move a cable supported by a sheave at the outer end of the crane boom for vertical lifting at the end of the boom. The trailer frame has an adjustable outrigger support to prevent vehicle tipping on inclined support surfaces or when supporting laterally extending masses.

3 Claims, 4 Drawing Sheets

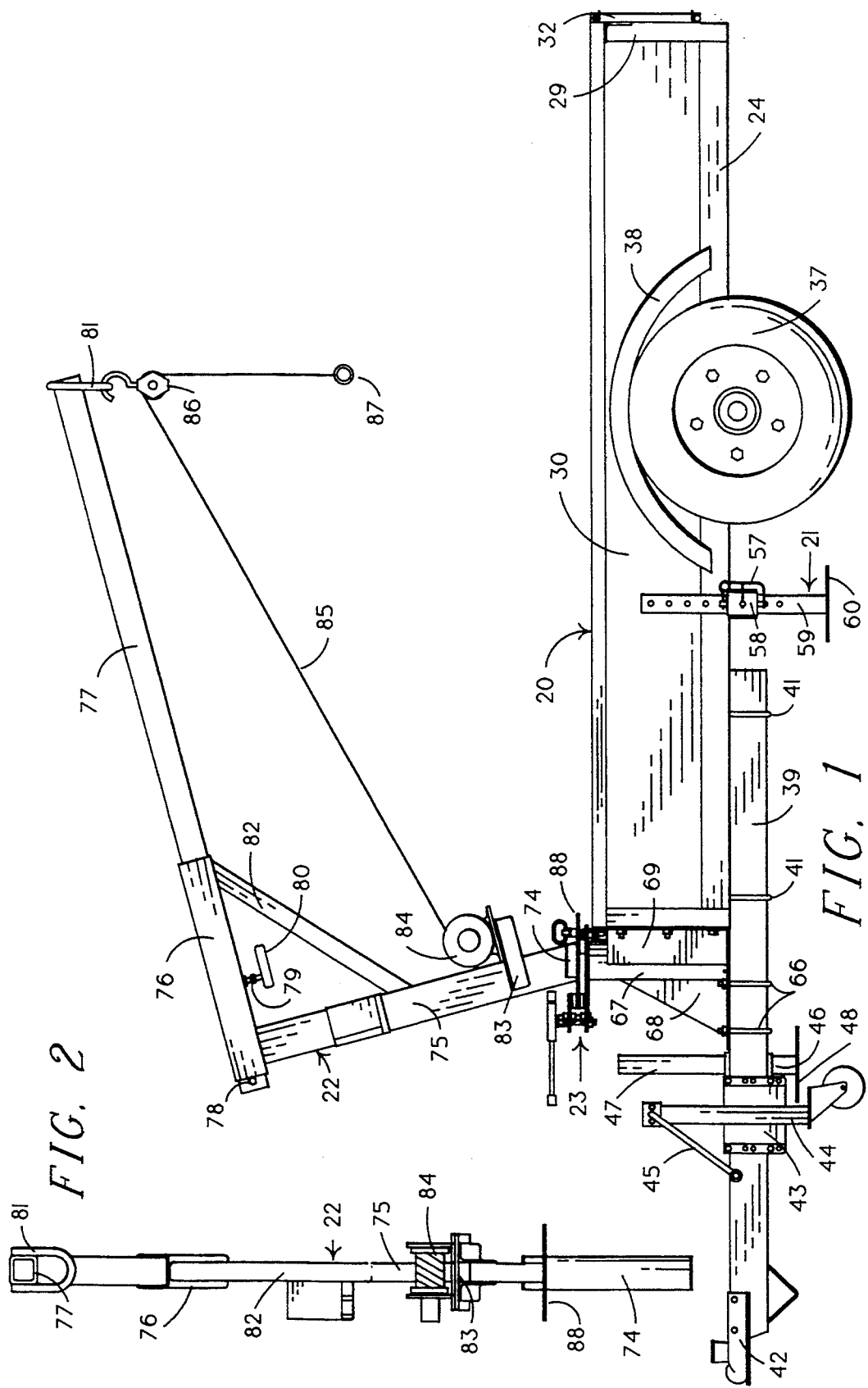

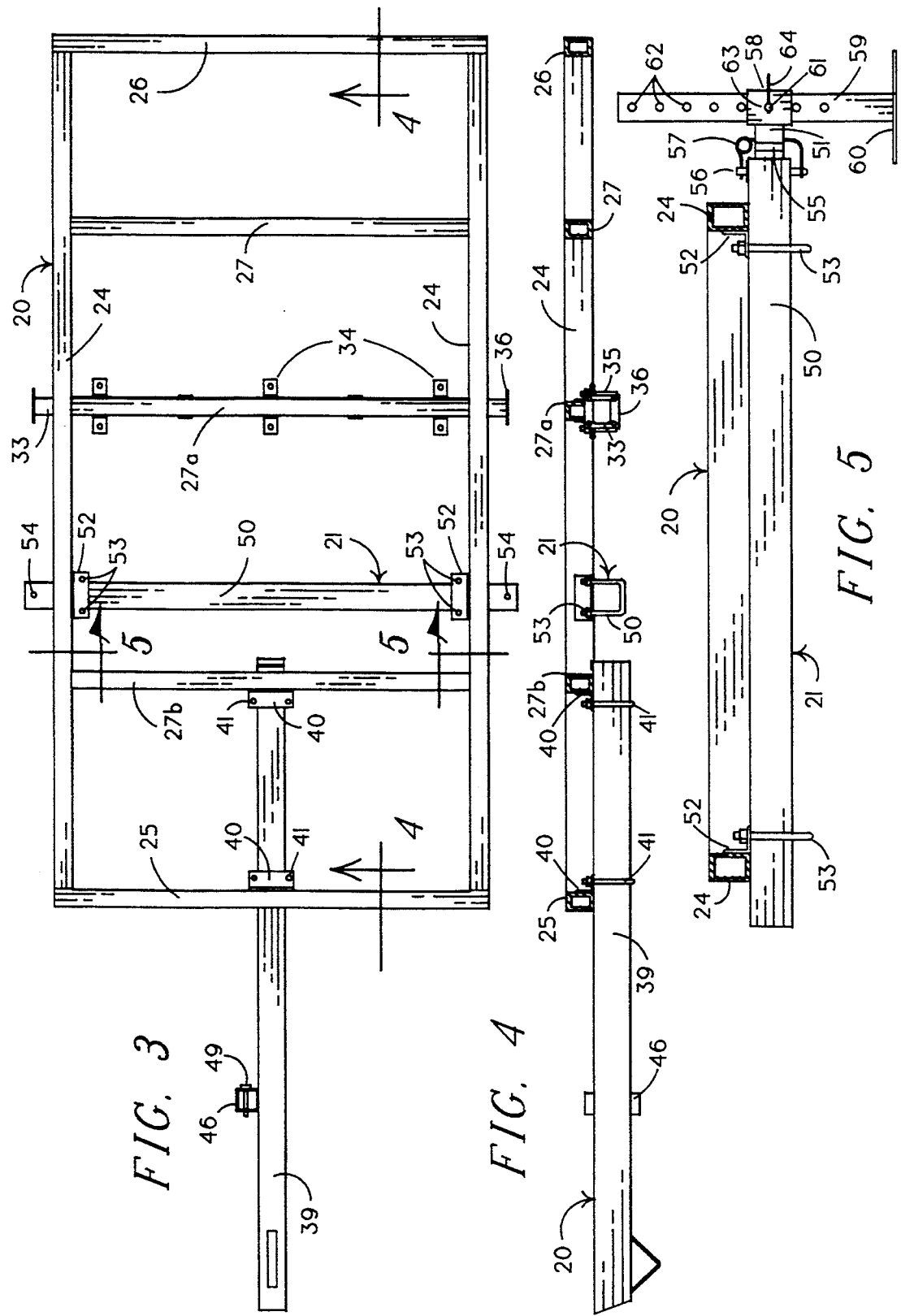

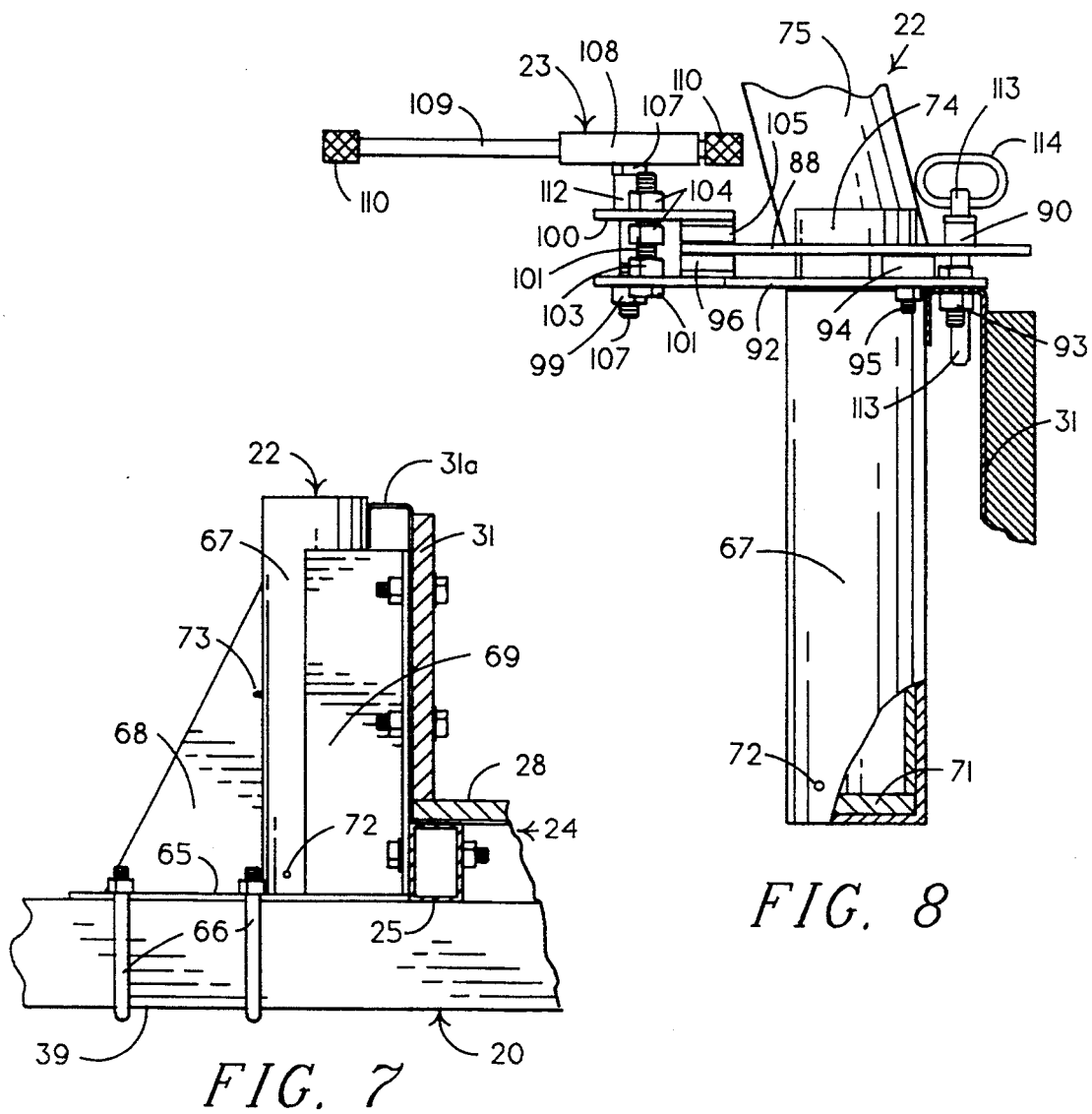
FIG. 7
FIG. 8
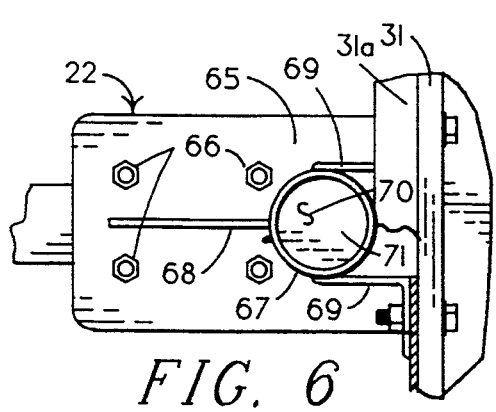
FIG. 6
FIG. 9

VEHICLE FOR TRANSPORT AND PLACEMENT OF GRAVE HEADSTONES

RELATED APPLICATIONS

This is a continuation in part of an application filed by the same inventor on May 18, 1992, under Ser. No. 07/885,145, and now abandoned.

BACKGROUND OF INVENTION

A. Field of the Invention

This invention relates generally to trailer having a crane type hoisting structure, and more particularly to such a trailer wherein the crane mast is rotatably mounted with braking mechanism regulating mast rotation.

B. Description of the Prior Art

Grave headstones generally are sufficiently massive to make their handling and transport relative difficult and often not possible by workmen without mechanical assistance. The handling of headstones is a common requirement about cemeteries, but notwithstanding, few mechanisms have been designed specifically for this purpose.

Headstone handling commonly has been accomplished by use of existing vehicles found about a cemetery, usually a backhoe, with or without the assistance of some secondary transport vehicle. Some headstone handling has been accomplished by concrete vault moving devices such as that disclosed in U.S. Pat. No. 2,915,206. In either case, however, the handling operation generally has required at least two workmen for its accomplishment, though neither workman is fully involved during the handling process for the entire period to make the operation inefficient. My invention solves this problem by providing a novel vehicle with a crane specifically adapted to the handling and transport of grave headstones by a single workman.

Vehicles having pivotally or rotatably mounted crane structures have heretofore become known for various purposes, though apparently not specifically for gravestone placement. Such vehicles generally have been of a self-powered nature rather than in the form of a trailer that is releasably attached to some secondary vehicle for transport. Since a vehicle for grave headstone placement is fairly specialized and not continuously usable in most cemeteries, my trailer type vehicle with its substantially lower cost than a self-propelled vehicle is more economically feasible and is distinguished in this regard over the self-propelled type vehicles.

The crane carrying vehicles that have pivotally or rotatably mounted a crane mast that is not powered for rotation generally have provided a freely movable mast that is not restrainable from pivoting motion in any adjustable fashion. This type of device may be used for placement of headstones on level grounds by a single workman, as in such circumstance the workman generally may manually move a hoisted headstone in a horizontal plane and have it remain in position while he moves away to control at a distance on the vehicle to raise or lower the stone. This operation, however, is not possible for a single workman loading or placing headstones with a vehicle on a sloping surface, as a freely rotatable mast will rotate to a position where the suspended headstone is at its lowest point.

My invention is distinguished from this type of device by providing a braking mechanism between the mast and its support structure that allows selectively adjustable friction between the two elements to allow a single workman to adjust the rotary position of a suspended headstone from a control point on the trailer spacedly distant from the headstone. This type of interconnecting structure provides an additional aid to the workman as the vehicle may be placed on the upper side of a sloping site where a stone is to be placed and the braking linkage used to allow gravity to rotate the crane mast to an appropriate position whereunder the headstone is to be placed. Similarly in loading headstones on a sloping surface, the vehicle may be positioned on the downhill side of the headstone so that after hoisting, force created by gravity acting on the headstone may be used by a workman to rotate the stone downwardly over the trailer bed where it is to be deposited for transport.

My vehicle also provides an outrigger type support which is not generally used with light trailer mounted cranes. The outrigger, however, is often necessary with my vehicle because when the vehicle is positioned on a sloping supporting surface with a heavy headstone rotated to a downward lateral position and with the crane boom extending laterally and downwardly away from the trailer structure, there may be a substantial tipping moment on the vehicle, such that without an outrigger support, the trailer might tip sideways. My particular type of outrigger support is vertically adjustable and of a symmetrical nature so that it may be used on either side of the vehicle.

My crane structure provides a mast angulated to the vertical and a boom extending substantially perpendicularly therefrom to allow greater height of the boom end than would result with the same element if the mast were vertical. The boom is adjustably mounted relative to the mast to allow selective extension. The tongue structure of my trailer has an associated vertically adjustable wheel support and downrigger to further aid stability during headstone loading or placement.

My invention resides not in any of these features per se, but rather in the synergistic combination of all of its structures that necessarily give rise to the functions flowing therefrom as herein specified and claimed.

SUMMARY OF INVENTION

My invention generally provides a two-wheeled trailer having a rectilinear bed with upstanding peripheral sides, an openable rear gate and a forwardly extending tongue for interconnection to a propelling vehicle. The trailer provides an upstanding crane mount supported by the tongue immediately forwardly of the bed. The crane mount rotatably carries an angulated upstanding crane mast supporting an adjustable perpendicularly extending boom. The crane mast supports a drum hoist carrying a cable communicating with a sheave in the outer end of the boom to carry the hoist cable for lifting. A vertically and laterally adjustable outrigger support is carried in a medial position beneath the trailer bed.

An adjustable friction braking mechanism communicates between the rotatable base of the crane mast and the mast support to regulate the amount of torque required to rotate the mast relative to its support. The braking mechanism is manually adjustable and provides a locking pin to maintain the crane structure in a null position extending over the trailer bed.

In creating such a vehicle, it is:

A principal object to-provide a trailer for loading, transporting and placement of grave headstones, especially on sloping terrain, by a single workman.

A further object is to provide such a trailer that has a hoisting mechanism comprising a medially positioned crane mast support that rotatably mounts a crane mast, with adjustable friction braking structure communicating between the mast and mast support to regulate the amount of torque required to rotate the mast relative to its support.

A further object is to provide such hoisting mechanism wherein the crane mast is angulated to the vertical and interconnects in its uppermost portion a perpendicular upwardly extending boom which is adjustably positionable for length of extension from the mast.

A still further object is to provide such hoisting mechanism wherein a mechanical hoist is carried in the lower portion of the mast structure to provide a mechanically movable cable supported by a sheave at the outer end of the crane boom to allow hoisting vertically therebeneath.

A still further object is to provide such a trailer that has a laterally extending outrigger type support that is both vertically and laterally adjustable and may be positioned on either side of the vehicle to prevent tipping on sloping supportative surfaces or with laterally positioned loads.

A still further object is to provide such a vehicle that is of new and novel design, of rugged and durable nature, of simple and economic manufacture and otherwise well suited to the uses and purposes for which it is intended.

Other and further objects of my invention will appear from the following specification and accompanying drawings which form a part hereof. In carrying out the objects of my invention, however, it is to be understood that its accidental features are susceptible of change in design and structural arrangement with only one preferred and practical embodiment of the best known mode being illustrated and specified in the drawings as is required.

BRIEF DESCRIPTION OF DRAWINGS

In the accompanying drawings which form a part hereof and wherein like numbers of reference refer to similar parts throughout:

FIG. 1 is an orthographic side view of my trailer showing its various parts, their configuration and relationship.

FIG. 2 is a forward looking orthographic view of the crane and hoisting structure, with the cable removed for clarity.

FIG. 3 is an orthographic plan view of the frame of my trailer.

FIG. 4 is a medial vertical cross-sectional view of the frame illustrated in FIG. 3, taken on the line 4—4 thereon in the direction indicated by the arrows.

FIG. 5 is a somewhat enlarged, rearward looking, transverse cross-sectional view showing the outrigger structure, taken on the line 5—5 on FIG. 3 in the direction indicated by the arrows thereon.

FIG. 6 is a partial orthographic plan view of the crane mast mounting structure.

FIG. 7 is a partial orthographic side view of the crane mast mounting structure of FIG. 6.

FIG. 8 is a partially cut-away orthographic side view of the brake structure communicating between the mast support and lower mast structure.

FIG. 9 is an orthographic bottom view of the caliper assembly of the brake structure.

DESCRIPTION OF PREFERRED EMBODIMENT

Figure 10:
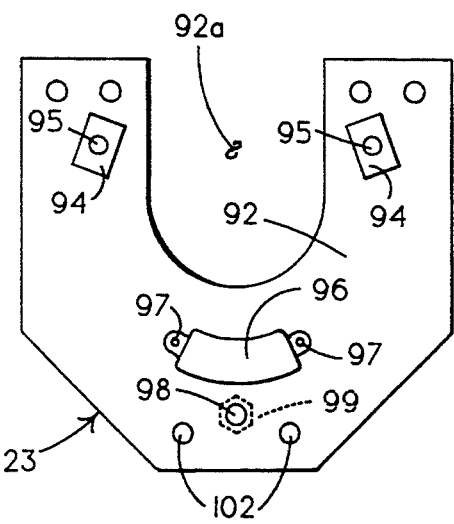
FIG. 10 is an orthographic plan view of the mounting plate of the brake structure.

My invention generally provides trailer 20 carrying laterally extending outrigger 21 and rotatable upstanding crane structure 22 having braking mechanism 23 communicating between the crane mast and its mounting structure.

Trailer 20 is of the ladder frame type providing spaced parallel side beams 24 interconnected by forward cross beam 25, rearward cross beam 26 and spaced intermediate cross beams 27, 27a and 27b. The trailer frame supports bed 28 and carries upstanding corner posts 29 that support upstanding sides 30 and front panel 31 The rear tail gate 32 is pivotally supported at its bottom on the frame structure for opening and closing. In the instance illustrated, the trailer bed and upstanding sides are formed by sheet plywood with an external covering of sheet metal, and preferably the sheet metal covering is of a continuous nature.

Medial cross beam 27a supports wheel axle beam 33 depending immediately therebelow by means of plural "L" shaped brackets 34 carried by the cross beam and supportably interconnecting the axle beam by plural "U" bolts 35 extending from paired opposed brackets 34 and about the axle beam therebeneath. Each end portion of axle beam 33 carries a fastening plate 36 which interconnects self-bearing wheels 37. Commonly for convenience, fenders 38 will be carried on upstanding body sides 30 to cover the upper portion of wheels 37.

The tongue structure provides elongate tongue beam 39 extending from forward cross beam 27b forwardly of the trailer frame in a laterally medial position. The tongue beam and cross beam 27b each carry "L" shaped brackets 40 to interconnect the tongue beam 39 immediately therebeneath by means of "U" shaped bolts 41 fastenably communicating from the brackets and about the tongue beam. The forward extension of the tongue beam 39 carries female trailer hitch 42 of standard configuration for attachment to a mating connector carried by a propelling vehicle. The medial portion of the tongue beam, spacedly forwardly of the trailer frame, carries bracket 43 interconnecting support wheel structure 44 which is vertically adjustable by means of an internal ratchet operated by a lever 45 to allow support of the tongue spacedly above an underlying supporting surface.

A support foot to aid hoisting stability of the trailer is carried on the tongue structure immediately rearwardly of the adjustable support wheel structure 44. Vertically oriented collar 46, structurally carried by the tongue beam, slidably receives vertical support post 47 carrying foot 48 at its lower extension. Collar 46 defines a horizontally extending fastening hole through its side portions and post 47 defines a plurality of similar cooperating horizontal holes that may be aligned with the collar hole for fastening of the foot at various vertically adjustable positions by pin 49 extending therebetween.

The structure of the trailer heretofore described is known, at least in its essence, and is reasonably standardized in the present day trailer arts. Various structural details of the trailer of my invention are therefore not described in detail as they are known to persons of ordinary skill in the trailer arts.

Outrigger 21, as seen especially in FIG. 5, provides elongate, laterally extending outrigger support beam 50 defining an internal channel to slidably receive outrigger beam 51. The trigger support beam is carried by "L" shaped brackets 52 structurally supported on frame side beams 24 by "U" bolts 53 extending from fastenable interconnection with the brackets about the support beam immediately therebeneath. The outrigger support beam 50 inwardly adjacent each of its ends defines fastening pin holes 54 extending vertically therethrough. Outrigger beam 51, of a length somewhat less than that of the outrigger support beam, defines a plurality of vertically oriented fastening pin holes 55 extending therethrough and positioned to align with fastening pin holes 54 in the support beam to receive fastening pin 56 therebetween to releasably fix the lateral extension of the outrigger beam in the outrigger support beam. The fastening pin 56 is releasably positionally maintained in fastening position by wire fastening clip 57.

One end portion of outrigger beam 51 structurally carries collar 58 defining a vertical channel to slidably receive vertical support shaft 59 carrying support foot 60 in its lower portion. Collar 58 defines medial fastening pin hole 61 and support shaft 59 defines a plurality of similar spaced cooperating fastening pin holes 62 which are movable into alignment with the collar hole 61 to receive fastening pin 63 therebetween where it may be releasably positionally maintained by wire clip 64 to allow adjustable vertical positioning of support foot 60 relative to outrigger beam 51. It is to be noted that with the structure described, the outrigger beam 51 may be inserted from either end within the outrigger support beam 50 so that the support foot 60 may be positioned on either side of the trailer structure.

Crane structure connecting mechanism 22 is shown especially in FIGS. 6 and 7. Horizontal mast support plate 65 is carried on the upper surface of tongue beam 39 immediately forwardly of upstanding front panel 31 of the trailer bed structure. The plate 65 is structurally fastened to the tongue beam by "U" bolts 66 extending from fastenable interconnection with the plate downwardly and about the tongue beam. The support plate structurally carries vertically upstanding cylindrical mast connecting collar 67 with its rearward surface adjacent the forward surface of forward panel 31 of the trailer bed. The mast connecting collar 67 is further supported by triangular fillet 68 extending from its forward surface to the upper surface of support plate 65 and by "L" shaped brackets 69 welded to each side portion of the collar 67 and bolted to forward upstanding panel 31. The collar defines cylindrical channel 70 having a vertical axis and configured to journal the lower portion of a crane mast. The bottom of the connector collar carries bearing plate 71 upon which the crane mast rests for rotation and defines a lower air hole 72 to allow placement and removal of crane mast base and a grease fitting 73 to allow lubrication of the journaling surface. The vertical extent of connecting collar 67 is not critical so long as it is sufficient to allow journaling and support of the base of the mast it is to carry, but generally to fulfill these needs and for convenience it extends to approximately the upper surface of front panel 31 of the trailer bed structure.

The crane mast is formed by lower cylindrical connecting portions 74 configured for journaling within channel 70 of connecting collar 67 and structurally interconnecting upstanding mast post 75. The mast post is a rectilinear peripherally defined beam preferably interconnected with connecting portion 74 in an angulated orientation as illustrated, with an inclination of about twenty degrees from the vertical, away from the boom outer end, to provide greater height for the outer end portion of a boom than would be provided by a vertically oriented mast with a perpendicular boom. The upper end portion of mast post 75 carries tubular boom support collar 76 extending perpendicularly therefrom. The boom support collar 76 defines an internal channel to slidably receive elongate peripherally defined rectilinear crane boom 77. The inner end of the crane boom 77 is prevented from passing completely through boom support collar 76 by pin 78 extending laterally therefrom adjacent its inner end and is positionally maintained in adjustable fashion within the boom support collar by bolt 79 threadedly engaged in a hole defined through the boom support collar and manipulatable by handle 80. The outer end portion of boom 77 carries pivotally interconnected elongate fastening link 81 to interconnect a sheave. The boom structure 76, 77 is additionally supported by angulated brace 82 extending from the outer end portion of support collar 76 to the medial portion of boom mast 75 as illustrated in FIG. 1. With this structure, the crane mast may be rotated in its journal in the boom support structure, and the boom beam 77 may be positionally adjusted relative to its support collar 76.

The lower medial portion of mast 75 supports perpendicularly extending hoist bracket 83 which in turn supports single drum hoist 84 carrying hoisting cable 85 which is supported on sheave 86 carried by fastening ring 81 at the end portion of boom 77. The end portion of a hoisting cable 85 carries connector ring 87 which may be used to interconnect various types of headstone fastening devices. The hoist 84 may be of a manually operated type or preferably is either electrically or hydraulically powered. Any such hoists are within the ambit of my invention, though not illustrated in detail, as they are well known in the hoisting and rigging arts.

Figure 11:
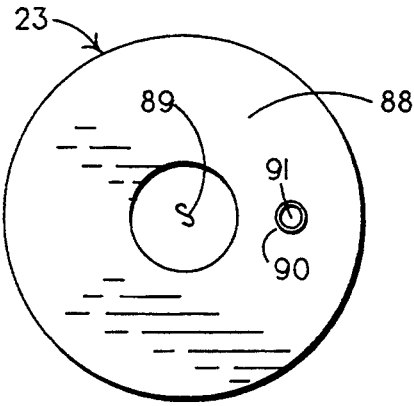
FIG. 11 is an orthographic plan view of the rotor assembly of the brake structure.
Figure 12:
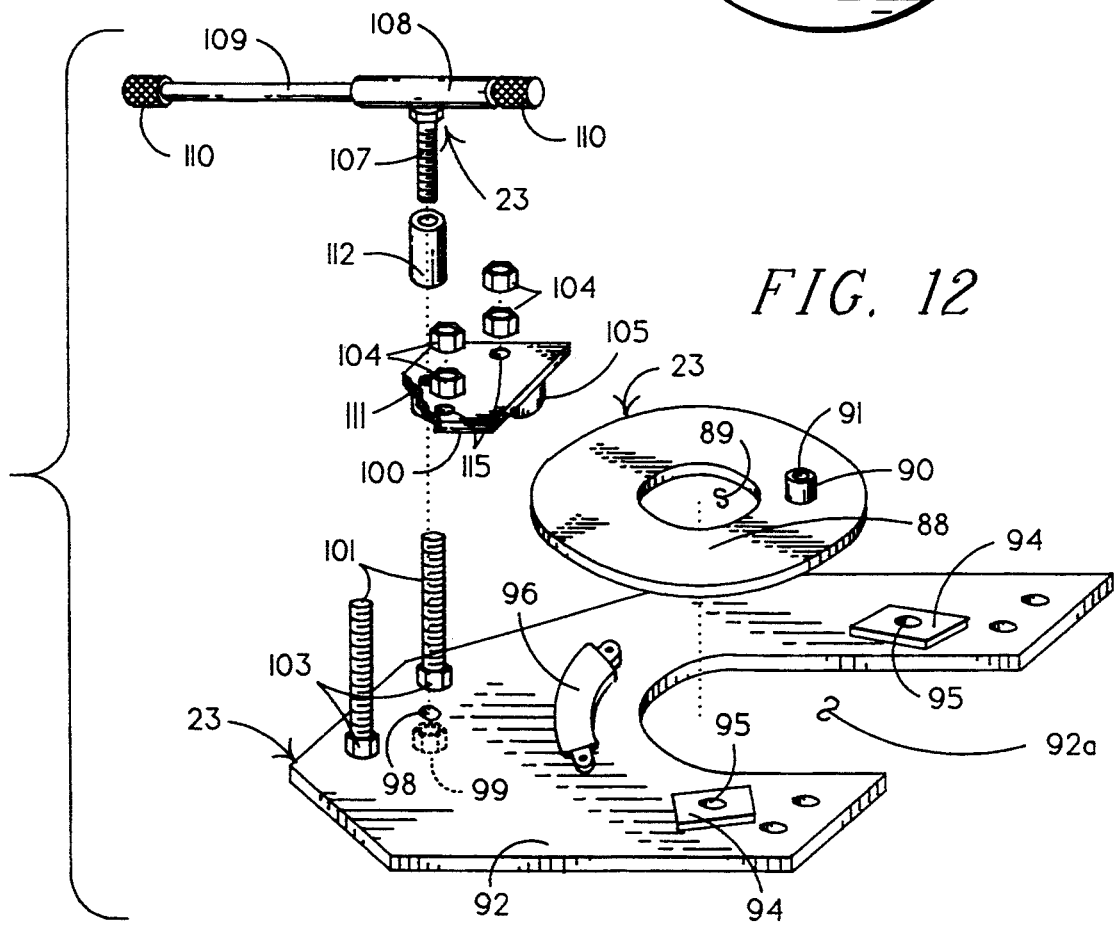
FIG. 12 is an expanded isometric view of the brake structure.

Braking mechanism 23 is illustrated in FIGS. 8–12. Angular rotor plate 88 defining medial hole 89 to fit about cylindrical mast connecting portion 74 is structurally attached to the mast connecting portion 74 spacedly above mast connecting collar 67 and preferably at the intersection of the lower portion of mast post 75 therewith. The rotor plate defines fastening pin hole 91, with upstanding cylindrical collar 90 extending spacedly upwardly about the periphery thereof to provide support for a fastening pin.

"U" shaped mounting plate 92, defining medial slot 92a to fit about mast connecting portion 74, is supported immediately above the upper surface of mast connector collar 67 by nut and bolt combinations 93 fastenably communicating between the mounting plate and the forwardly extending portion of trailer body panel covering 31a therebeneath. The upper surface of each of the arms of brake mounting plate 92 carry similar upwardly extending rectilinear brake pads 94, structurally maintained by fasteners 95 extending through holes defined in the interconnected elements. The upper head portions of fasteners 95 are countersunk to avoid interference with frictional engagement of the brake rotor with the brake pads 94. The forward portion of mounting plate 92 carries arcuate upwardly extending brake pad 96 structurally maintained by fasteners 97 extending therethrough and into fastenable communication with the mounting plate. Forwardly of brake pad 96 the mounting plate 92 defines threaded adjustment bolt hole 98, in the instance illustrated formed by welding nut 99 to the lower surface of the mounting plate in alignment with the adjustment bolt hole.

Brake caliper plate 100 is carried on spaced bolts 101 extending through holes 115 defined in the caliper plate and supported in holes 102 defined in the forward portion of mounting plate 92. The bolts 101 are supported in the mounting plate 92 by nuts 103 tightened against their heads, and the caliper plate 100 is positionally maintained for some vertical motion on the bolts 101 between spaced upper and lower adjusting nuts 104 carried on both sides of the caliper plate so that the caliper plate is positioned for some adjustable vertical motion above brake rotor 88. The undersurface of caliper plate 100 facing the brake rotor carries arcuate depending brake pad 105 of configuration similar to brake pad 96 carried by the mounting plate 92 therebeneath. The brake pad 105 is structurally interconnected by fasteners 106 extending therethrough and into fastenable engagement with the brake caliper plate 100.

Brake adjustment bolt 107 provides horizontal handle collar 108 structurally interconnected to its head to slidably receive manipulation rod 109 positionally maintained in the collar by larger end portions 110. The adjustment bolt 107 carries sleeve 112 between its head and the downwardly adjacent brake caliper to prevent the caliper from moving upwardly on the adjustment bolt. The adjustment bolt 107 extends through hole 111 defined in brake caliper plate 100, through hole 98 defined in mounting plate 92 and into threaded engagement with nut 99 beneath hole 98 and on the underside of mounting plate 92, so that by tightening the adjustment bolt in nut 99 the brake pad 96 carried by the upper surface of the brake mounting plate 92 and the brake pad carried by the lower surface of the brake caliper will come into increasing frictional engagement with brake rotor 88 to cause an adjustable braking reaction of rotary motion of crane mast relative to its mounting structure.

Fastening pin 113, having pivotally mounted ring-type head 114 to aid manipulation, is carried in collar 90 of brake rotor 88 to extend through fastening pin bole 91 and depend therefrom into a complementary hole defined in the upper forwardly extending portion of body panel covering 31a upstanding panel 31 to maintain the crane structure in a fixed null position, normally with the boom extending rearwardly over the trailer bed as illustrated in FIG. 1.

Having thusly described the structure of my invention, its operation may be understood.

Firstly, a vehicle is constructed according to the foregoing specification, fitted with an appropriate hoist structure and releasably attached to a propelling vehicle.

For use on a horizontal supporting surface, the trailer is positioned laterally adjacent a site where a tombstone is to be loaded or placed. The brake mechanism is released by rotating handle 109 controlling adjustment bolt 107 to lessen friction between the brake pads 105 and 96 and brake disk 88 to allow rotary motion of the crane structure. The crane structure is then manually rotated to a position whereat the depending portion of hoisting line 85 is immediately above a headstone to be moved. An appropriate fastening device (not shown) is attached about the headstone and to fastening ring 87 carried by the hoisting line 85. On a level surface, the brake may be left in a non-braking condition or, if desired for safety purposes, it may again be fastened. Hoist 84 is then operated to lift the headstone. The crane structure is thereafter manually rotated, after release of the braking mechanism if necessary, to a position immediately above that at which the stone is to rest. The brake is then tightened again if desired, and the hoist operated to lower the stone into its final resting position. The operation is substantially the same for loading a stone onto trailer bed 28 or unloading one from that bed to an adjacent grave site. Normally when the trailer is used on level ground, it is not particularly necessary to fasten the braking mechanism during raising and lowering operations, as there will be only vertical forces on the crane with no torquing components to cause rotary motion of the crane.

To use my trailer for loading a headstone when supported on a sloping surface, the vehicle is positioned on the downward side and adjacent of the headstone to be loaded with the crane pivot point slightly forwardly of the headstone. The braking mechanism is then released and the crane manually rotated to a position where the depending hoisting line is vertically above the headstone and is then tightened to prevent further rotary motion. An appropriate headstone fastening device (not shown) is fastened about the headstone and to ring 87 carried by the hoisting cable 85. The hoist is then operated to raise the headstone above the highest point of the upstanding side portions of the trailer bed. The operator then gradually releases the braking mechanism and the crane will rotate to move the supported headstone toward its lowest position which will move it over the trailer bed. As rotation occurs, the braking mechanism is retightened when the stone is vertically above the trailer bed. The hoist 84 is then operated to lower the stone onto the trailer bed and it is then ready for transport on the trailer to a grave site.

To place the stone on a grave site located on a sloping surface, my trailer is positioned on the upper side of that grave site, laterally adjacent the position at which the stone is ultimately to be placed and with the crane pivot point slightly forwardly of the placement site. The length of boom 77 is adjusted if necessary to allow the stone to be picked up and rotated to a position over its placement site. The braking mechanism is released, the crane manually rotated so that its depending hoisting cable is vertically above the headstone on the trailer bed, and the headstone fastened by a suitable harness (not shown) to the hoist cable. The brake mechanism is then set to prevent rotation of the crane and hoist 84 operated to raise the headstone above the highest point of the trailer bed side structure. The braking mechanism is then gradually released and when its friction is sufficiently decreased, the crane will rotate downwardly toward the lowest position of the headstone by reason of action of gravity on the headstone. When this rotation brings the headstone vertically above its placement site, the brake mechanism is again tightened to maintain this rotary position of the crane. The hoist 84 is again operated to lower the headstone into its desired position for placement.

It is to be particularly noted in considering the operation of my invention that it may be used by a single workman to either load or place headstones when the trailer is supported on a sloping surface. This operation generally cannot be accomplished by a single workman with devices that have heretofore been used for the placement of headstones or with ordinary unpowered rotatable hoist structures that do not have a braking mechanism, because in general a single workman cannot operate the controls of such a device and still observe and regulate the proper placement of a headstone.

The foregoing description of my invention is necessarily of a detailed nature so that a specific embodiment of it might be set forth as required, but it is to be understood that various modifications of detail, rearrangement and multiplication of parts might be resorted to without departing to its spirit, essence or scope.

Having thusly described by invention, what I desire to protect by Letters Patent, and

What I claim is:

1. A trailer type vehicle for loading, transporting and placement of heavy objects by a single workman, comprising in combination:

a trailer having a frame supporting a bed, at least two axially opposed wheels for locomotion, and a forwardly extending tongue structure including a tongue beam having means for attachment to a propelling vehicle;

an outrigger structure having an elongate outrigger support beam carried by the trailer frame to extend laterally therefrom, said support beam slidably carrying an outrigger beam having a vertically adjustable support foot structure at one end, and having means for adjustable lateral positioning of the outrigger beam in the outrigger support beam;

a crane mast support structure carried on the trailer frame including an upstanding crane mast connecting collar defining an internal channel for journaling a crane mast connecting portion;

a crane mast connecting portion journaled in said crane mast connecting collar for rotatable motion and carrying an upwardly extending crane mast having an outwardly extending crane boom and a hoist having a cable supported by the crane boom;

braking structure communicating between the crane mast the trailer, including an annular brake rotor irrotatably supported on the crane mast spacedly above the crane mast connecting collar, a brake mounting plate therebeneath irrotatably supported by the trailer and having at least one upstanding friction pad extending adjacent the brake rotor, a brake caliper plate supported by the brake mounting plate spacedly above the brake rotor and having at least one depending brake pad extending adjacent to the brake rotor, and screw means communicating between the brake mounting plate and brake caliper to adjustably move the brake mounting plate and brake caliper into frictional contact with the brake rotor.

2. A two-wheeled trailer type vehicle for loading, transporting and placement of grave headstones by a single workman, comprising in combination:

a trailer having a ladder type frame supporting a bed with upstanding sides, a single transverse axle carrying rotatable wheels at each end and a forwardly extending tongue structure including a tongue beam having means for attachment to a propelling vehicle and vertically adjustable means for supporting the tongue on an underlying surface;

an outrigger structure having an elongate symmetrical outrigger support beam carried by the trailer frame to extend laterally therefrom, said outrigger support beam slidably carrying an outrigger beam having a vertically adjustable support foot structure at one end and means for adjustable lateral positioning of the outrigger beam in the outrigger support beam, crane mast support structure carried on the tongue beam forwardly of the trailer bed and comprising an upstanding crane mast connecting collar extending upwardly above the upstanding sides of the trailer bed and defining a channel for journaling a crane mast connecting portion;

a crane mast connecting portion journaled in said crane mast connecting collar for rotary motion and carrying an upstanding crane mast carrying a crane boom and a hoist having a cable supported by the crane boom; and braking structure, communicating between the crane mast connecting collar and the trailer, including an annular brake rotor irrotatably supported on the crane mast connecting portion spacedly above the crane mast connecting collar, a brake mounting plate irrotatably supported by the trailer spacedly beneath the brake rotor, said brake mounting plate having at least one upstanding friction pad extending adjacent the brake rotor, a brake caliper supported by the brake mounting plate for adjustable vertical positioning spacedly above the brake rotor and having at least one depending brake pad extending adjacent the brake rotor, and threaded means communicating between the brake mounting plate and brake caliper to adjustably move the mounting plate and brake caliper into frictional contact with the brake rotor therebetween.

3. In a trailer type vehicle for loading, transporting and placement of heavy objects by a single workman, of the type having a frame supporting a bed with upstanding sides, opposed wheels for locomotion and a tongue structure, the improvement comprising in combination:

an outrigger structure having a support beam carried by the trailer frame to extend laterally therefrom and slidably carry for adjustable extension therefrom an outrigger beam having an adjustably depending foot structure, a rotatable crane having a mast rotatably journaled in crane mast support structure carried by the trailer and supporting an outwardly extending boom and a hoist with cable operatively depending from the outer end of the boom, and braking structure communicating between the crane mast and the trailer frame to adjustably regulate torque required to rotate the crane in the crane support structure, said braking structure comprising an annular brake rotor irrotatably supported on the crane mast supported structure, a brake mounting plate irrotatably supported by the trailer structure spacedly beneath the brake rotor, said brake mounting plate having at least one upstanding friction pad extending adjacent the brake rotor, a brake caliper supported by the brake mounting plate for adjustable vertical positioning spacedly above the brake rotor and having at least one depending brake pad extending adjacent to the brake rotor, and screw means communicating between the brake mounting plate and brake caliper to adjustably move the brake mounting plate and brake caliper into frictional contact with the brake rotor therebetween.

* * * * *